(12) United States Patent
Lee et al.

(10) Patent No.: US 7,992,617 B1
(45) Date of Patent: Aug. 9, 2011

(54) SHEET LAMINATING APPARATUS

(75) Inventors: Yen-Te Lee, Taipei (TW); Yung-Tai Pan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 12/792,006

(22) Filed: Jun. 2, 2010

(30) Foreign Application Priority Data

Mar. 19, 2010 (TW) ................................ 99108163 A

(51) Int. Cl.
*B32B 37/00* (2006.01)
(52) U.S. Cl. .................... 156/499; 156/555; 156/582
(58) Field of Classification Search .................. 156/499, 156/555, 580, 582, 583.1; 100/327, 328, 100/160, 176
See application file for complete search history.

(56) References Cited

U.S. PATENT DOCUMENTS

| | | | | |
|---|---|---|---|---|
| 4,387,000 A * | 6/1983 | Tancredi | ........................ | 156/495 |
| 5,232,538 A * | 8/1993 | Liu | ................................ | 156/359 |
| 7,013,945 B2 * | 3/2006 | Kim | ................................ | 156/555 |
| 7,063,119 B1 * | 6/2006 | Kim | ................................ | 156/555 |
| 7,571,755 B2 * | 8/2009 | Kim | ................................ | 156/555 |
| 7,886,799 B2 * | 2/2011 | Bradley | ........................ | 156/555 |

* cited by examiner

*Primary Examiner* — James Sells
(74) *Attorney, Agent, or Firm* — Kirton & McConkie; Evan R. Witt

(57) ABSTRACT

A sheet laminating apparatus is provided for laminating two films and a sheet article between the two films. The sheet laminating apparatus includes a first side plate, a second side plate, a first laminating module and a second laminating module. The second laminating module includes a second conveying and laminating roller, a second heating member and a supporting member. The supporting member is disposed on the first side plate, and arranged between the second conveying and laminating roller and the second heating member. During operation of the sheet laminating apparatus, the two films and the sheet article are sustained against the second conveying and laminating roller to move the second conveying and laminating roller in a first direction. Due to the supporting member, the second heating member is also moved in the first direction, but the second conveying and laminating roller is not contacted with the second heating member.

10 Claims, 10 Drawing Sheets

SHEET LAMINATING APPARATUS

FIELD OF THE INVENTION

The present invention relates to a sheet laminating apparatus, and more particularly to a sheet laminating apparatus for laminating two films of a pouch and a sheet article between the two films.

BACKGROUND OF THE INVENTION

Conventionally, a sheet article such as a document or a photo is usually covered with a protective film for protection because such a sheet article is readily suffered from damage. Generally, the sheet article is clamped between two films (i.e. thermoplastic films), and then sealed between these two films by a sheet laminating apparatus in order to achieve the protective purpose.

Hereinafter, the configurations of a conventional sheet laminating apparatus will be illustrated with reference to FIG. 1. FIG. 1 is a schematic side view illustrating a conventional sheet laminating apparatus. As shown in FIG. 1, the sheet laminating apparatus 1 comprises a heat-treating member 10, a conveying and laminating roller 11 and a transfer passage 12. The heat-treating member 10 comprises an electrically-heated plate 101 and a heater 102. The operations of the sheet laminating apparatus 1 will be described as follows. Firstly, a sandwich structure of an article sheet (not shown) intervening between two films (not shown) is fed to the conveying and laminating roller 11 through the transfer passage 12. By means of the conveying and laminating roller 11, the article sheet and the two films are continuously transported through the passage 12. During this stage, the electrically-heated plate 101 of the heat-treating member 10 transforms electricity to heat energy. The heat energy is uniformly distributed by the heater 102 and radiated through an air gap so as to heat up the conveying and laminating roller 11. The heated conveying and laminating roller 11 performs a hot pressing operation (i.e. a laminating operation) on the sandwich structure that is transported through the transfer passage 12. As such, the two films are softened by the heat energy in the transfer passage 12. After being transmitted and pressed by the conveying and laminating roller 11, the sheet article bonds with the softened films to form a laminated structure, and thus the sheet article is fixed between these two films. Afterwards, the laminated structure is transported across the transfer passage 12 and withdrawn from the sheet laminating apparatus 1, and the laminating operation is completed.

Although the conventional sheet laminating apparatus 1 is able to laminate the sheet article and the films, the conventional sheet laminating apparatus 1 may incur some problems if the thicknesses of the sheet article and the films are too large. FIG. 2 is a schematic side view illustrating the use of a conventional sheet laminating apparatus to laminate two films and a sheet article. For example, for laminating a thick sheet article D and two thick films S1 and S2, the sheet article D and the two films S1 and S2 are transported across the transfer passage 12 and then introduced into a region between two conveying and laminating rollers 11. At this moment, since the overall thickness of the sheet article D and the two films S1 and S2 is greater than the spacing interval between the two conveying and laminating rollers 11, the sheet article D and the two films S1 and S2 are sustained against the conveying and laminating rollers 11 to move the conveying and laminating rollers 11. That is, the upper conveying and laminating roller 11 (see FIG. 2) is moved upwardly, and the lower conveying and laminating roller 11 (see FIG. 2) is moved downwardly. As known, during the process of moving the conveying and laminating rollers 11, the conveying and laminating rollers 11 are readily collided with the high-temperature heaters 102. In this circumstance, the conveying and laminating rollers 11 are possibly damaged by the high-temperature heaters 102.

For preventing the sheet article and the two films from being sustained against the conveying and laminating rollers to result in collision between the conveying and laminating rollers and the heaters, some commercially available sheet laminating apparatuses are designed to increase the spacing interval between the conveying and laminating roller and the heater. Although the increase of the spacing interval between the conveying and laminating roller and the heater may avoid the collision between the conveying and laminating roller and the heater, some new problems occur. For example, since the spacing interval between the conveying and laminating roller and the heater is increased, the loss of the heat energy is increased and the heating efficiency of the sheet laminating apparatus is usually insufficient. In other words, the time period of delivering heat energy to the conveying and laminating roller is prolonged.

Therefore, there is a need of providing an improved sheet laminating apparatus in order to enhance the heating efficiency and reduce the damage of the conveying and laminating roller from collision.

SUMMARY OF THE INVENTION

An object of the present invention provides a sheet laminating apparatus for minimizing the possibility of causing collision between the conveying and laminating roller and the heater.

Another object of the present invention provides a sheet laminating apparatus for minimizing loss of the heat energy.

In accordance with an aspect of the present invention, there is provided a sheet laminating apparatus for laminating two films and a sheet article between the two films. The sheet laminating apparatus includes a first side plate, a second side plate, a first laminating module and a second laminating module. The first laminating module is arranged between the first side plate and the second side plate. The second laminating module is arranged between the first side plate and the second side plate, and disposed beside the first laminating module. When the two films and the sheet article are transported across a region between the first laminating module and the second laminating module, the two films and the sheet article are laminated by the first laminating module and the second laminating module. The second laminating module includes a second conveying and laminating roller, a second heating member and a supporting member. When the two films and the sheet article are transported across the second conveying and laminating roller, the second conveying and laminating roller is contacted with a first film of the two films, and the first film is sustained against the second conveying and laminating roller to move the second conveying and laminating roller. The second heating member is used for providing heat energy to the second conveying and laminating roller. The supporting member is arranged between the second conveying and laminating roller and the second heating member. When the two films and the sheet article are transported across the region between the first laminating module and the second laminating module, the first film and the sheet article are sustained against the second conveying and laminating roller to move the second conveying and laminating roller, the supporting member and the second heating member in a first direction, but the second conveying and laminating roller is not contacted with the second heating member.

In an embodiment, the supporting member includes a first fixing hole and a second fixing hole. The second heating member penetrates through the first fixing hole. The second heating member further includes a fixed shaft collar penetrating through the second fixing hole, so that the fixed shaft collar is fixed on the supporting member. The second conveying and laminating roller penetrates through the fixed shaft collar, so that the second conveying and laminating roller is fixed on the supporting member.

In an embodiment, the first side plate includes a first opening, a second opening and a sliding groove. The first laminating module penetrates through the first opening, so that the first laminating module is fixed on the first side plate. The fixed shaft collar and the second laminating module penetrate through the second opening. The fixed shaft collar and the second laminating module are movable within the second opening in the first direction. The sliding groove is formed in a surface of the first side plate for accommodating the supporting member. When the two films and the sheet article are sustained against the second conveying and laminating roller, the supporting member is moved within the sliding groove in the first direction. The second opening is larger than the first opening.

In an embodiment, the supporting member includes a first contact part and a second contact part. The first contact part is contacted with the second heating member. The second heating member further includes a fixed shaft collar, which is connected with the first side plate and contacted with the second contact part. The second conveying and laminating roller penetrates through the fixed shaft collar, so that the second conveying and laminating roller is fixed on the first side plate.

In an embodiment, the first side plate includes a first opening, a second opening and a sliding groove. The first laminating module penetrates through the first opening, so that the first laminating module is fixed on the first side plate. The fixed shaft collar and the second laminating module penetrate through the second opening. The fixed shaft collar and the second laminating module are movable within the second opening in the first direction. The fixed shaft collar is sustained against the second contact part to move the supporting member in the first direction. The sliding groove is formed in a surface of the first side plate for accommodating the supporting member. When the two films and the sheet article are sustained against the second conveying and laminating roller, the supporting member is moved within the sliding groove in the first direction. The second opening is larger than the first opening.

In an embodiment, the sheet laminating apparatus further includes a restoring mechanism, which is disposed on the supporting member and the first side plate for providing an elastic restoring force to the supporting member, so that the supporting member is moved in a second direction opposed to the first direction.

In an embodiment, the restoring mechanism includes a restoring frame, a spring and a screw. The restoring frame has a sustaining part. The restoring frame is connected with the second laminating module, so that the restoring frame is synchronously moved with the second laminating module. The spring is contact with the sustaining part for providing the elastic restoring force. The screw is sheathed by the spring and the sustaining part, and tightened in a fixing part of the first side plate. The spring is fixed and compressed by the screw, so that the spring is sustained again the restoring frame to provide an elastic compressible force in the second direction to the second conveying and laminating roller, thereby laminating the two films and the sheet article.

In an embodiment, the first laminating module includes a first conveying and laminating roller and a first heating member. When the two films and the sheet article are transported across the first laminating module, the first conveying and laminating roller is contacted with a second film of the two films. The first heating member is used for providing heat energy to the first conveying and laminating roller.

In an embodiment, the sheet laminating apparatus further includes a driving motor and a transmission mechanism. The driving motor for is used providing motive power. The transmission mechanism is used for transmitting the motive power of the driving motor to the first laminating module and the second laminating module. The second laminating module includes a driving gear, a first transmission gear, a second transmission gear and a third transmission gear. The driving gear is connected with the driving motor for transmitting the motive power of the driving motor. The first transmission gear is connected to a first end of the first conveying and laminating roller, and engaged with the driving gear. The first transmission gear is synchronously rotated with the driving gear to drive rotation of the first conveying and laminating roller. The second transmission gear is connected to a second end of the first conveying and laminating roller. The second transmission gear is synchronously rotated with the first conveying and laminating roller. The third transmission gear is connected to the second conveying and laminating roller, and engaged with the second transmission gear. The second conveying and laminating roller is rotated as the second transmission gear is rotated.

In an embodiment, the second heating member includes a second heat source and a second heat holding cover. The second heat source is used for producing heat energy. The second heat holding cover encloses the second heat source to prevent from loss of the heat energy.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a sheet laminating apparatus in order to obviate the drawbacks encountered from the prior art.

Figure 1:
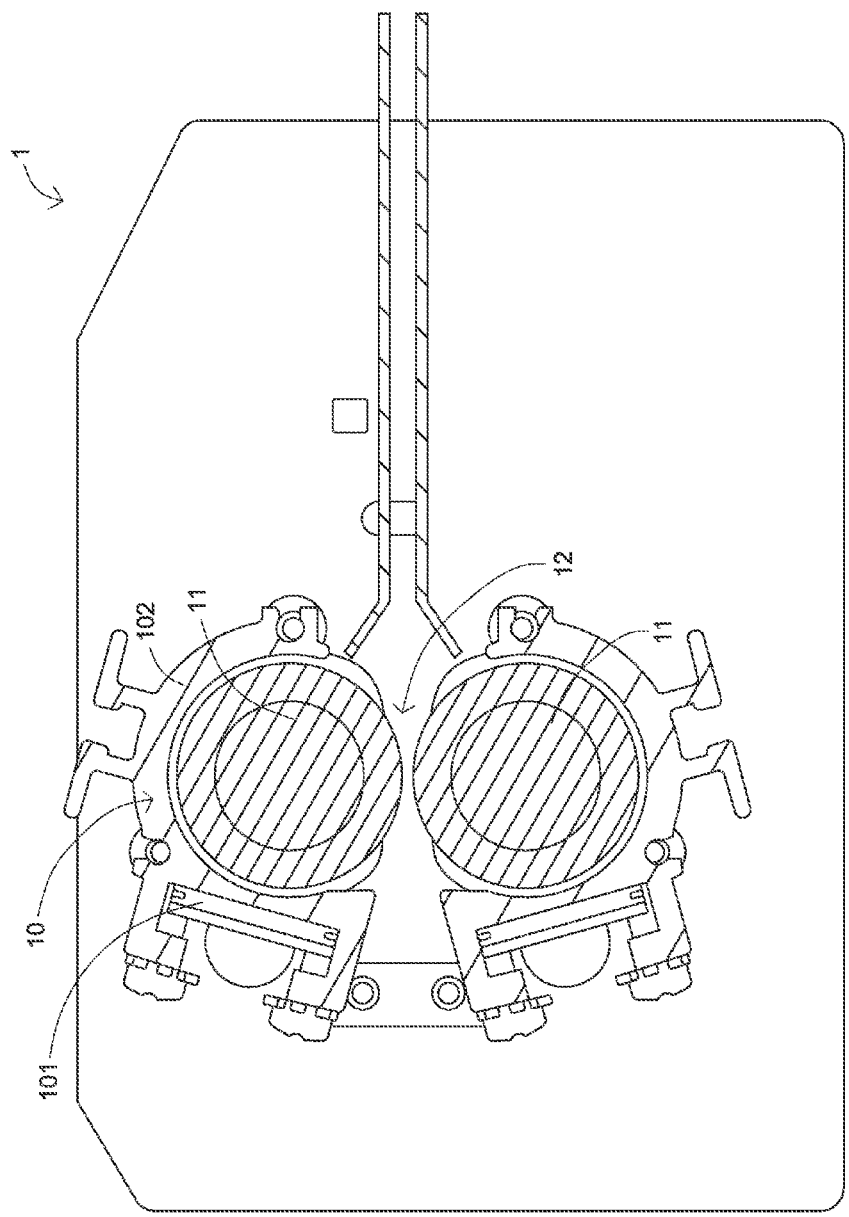
FIG. 1 is a schematic side view illustrating a conventional sheet laminating apparatus.
Figure 2:
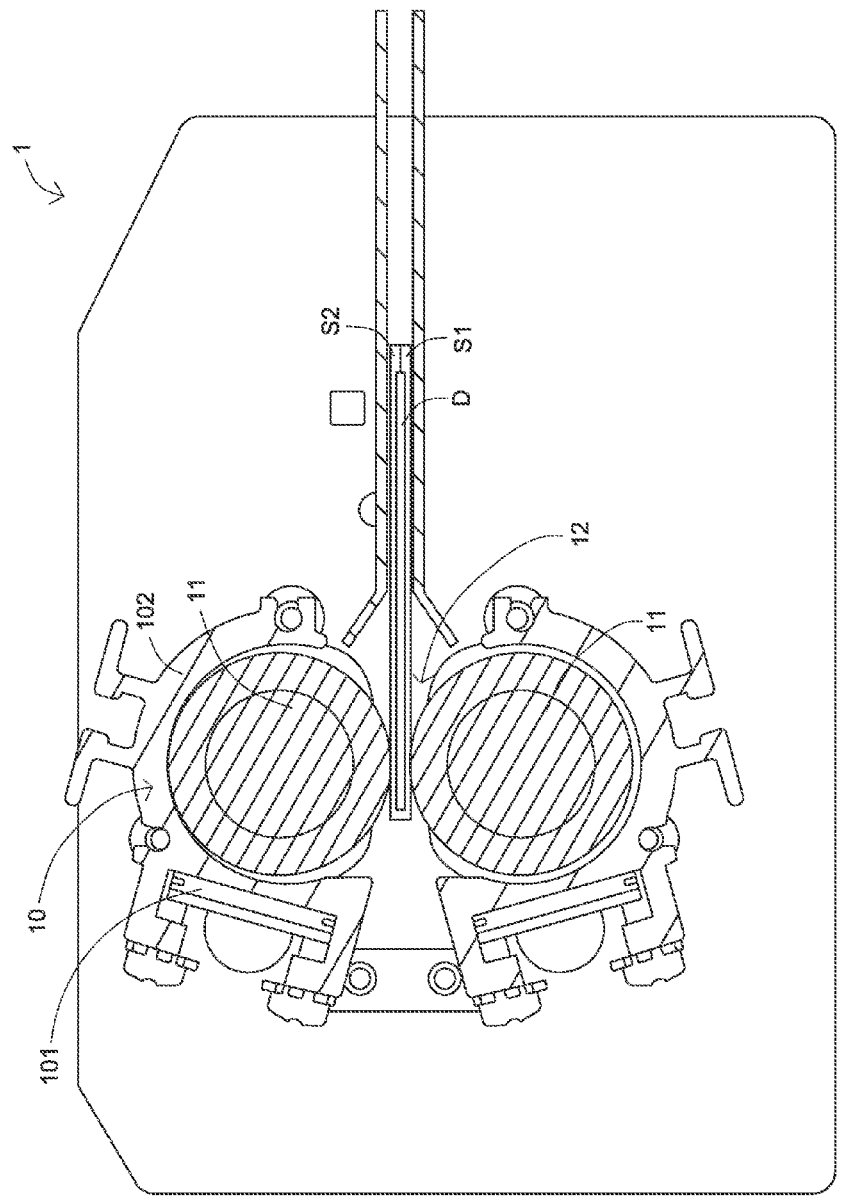
FIG. 2 is a schematic side view illustrating the use of a conventional sheet laminating apparatus to laminate two films and a sheet article.
Figure 3:
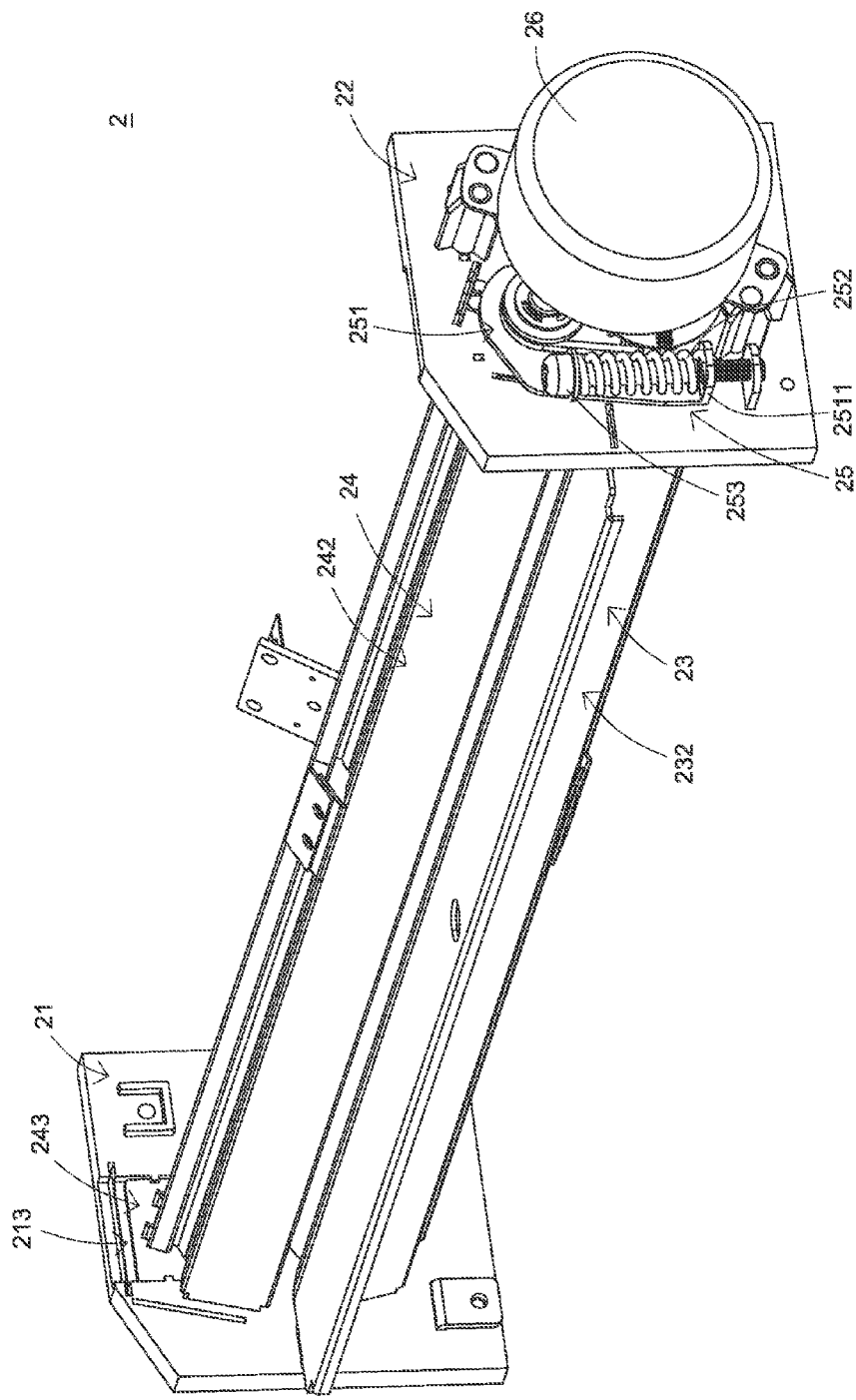
FIG. 3 is a schematic perspective view illustrating a sheet laminating apparatus according to a first embodiment of the present invention.
Figure 4:
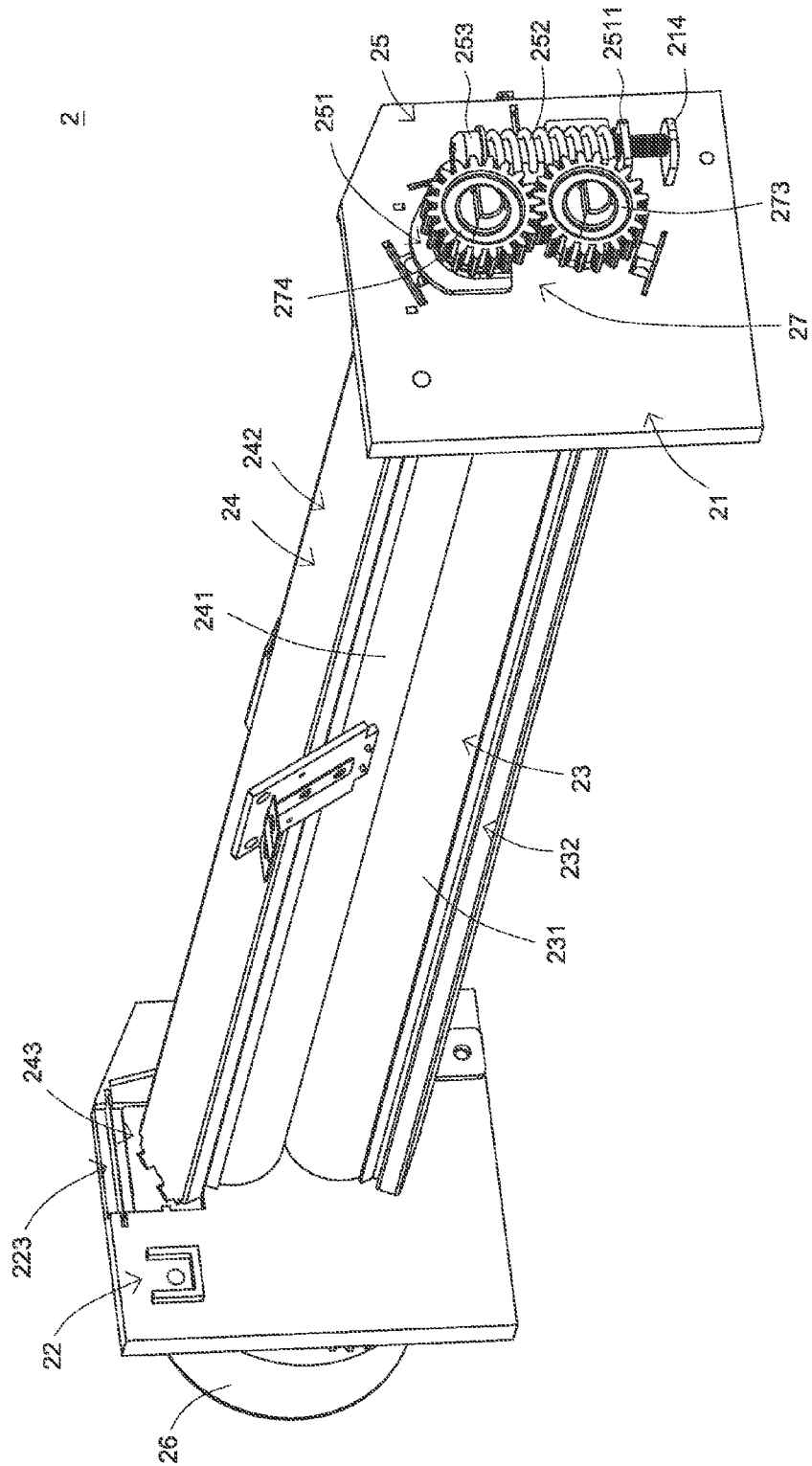
FIG. 4 is a schematic perspective view illustrating a sheet laminating apparatus according to the first embodiment of the present invention and taken along another viewpoint.

FIG. 3 is a schematic perspective view illustrating a sheet laminating apparatus according to a first embodiment of the present invention. FIG. 4 is a schematic perspective view illustrating a sheet laminating apparatus according to the first embodiment of the present invention and taken along another viewpoint. The sheet laminating apparatus 2 comprises a first side plate 21, a second side plate 22, a first laminating module 23, a second laminating module 24, a restoring mechanism 25, a driving motor 26 and a transmission mechanism 27. The first laminating module 23 and the second laminating module 24 are arranged between the first side plate 21 and the second side plate 22. The second laminating module 24 is arranged beside the first laminating module 23. When two films S1' and S2' (see FIG. 8B) and a sheet article D' (see FIG. 8B) sandwiched between these two films are intended to be laminated and transported across a region between the first laminating module 23 and the second laminating module 24, the two films S1' and S2' are respectively contacted with the first laminating module 23 and the second laminating module 24. The restoring mechanism 25 is used for providing an elastic compressible force and an elastic restoring force. The driving motor 26 is used for providing motive power. The transmission mechanism 27 is used for transmitting the motive power of the driving motor 26 to the first laminating module 23 and the second laminating module 24.

Figure 5:
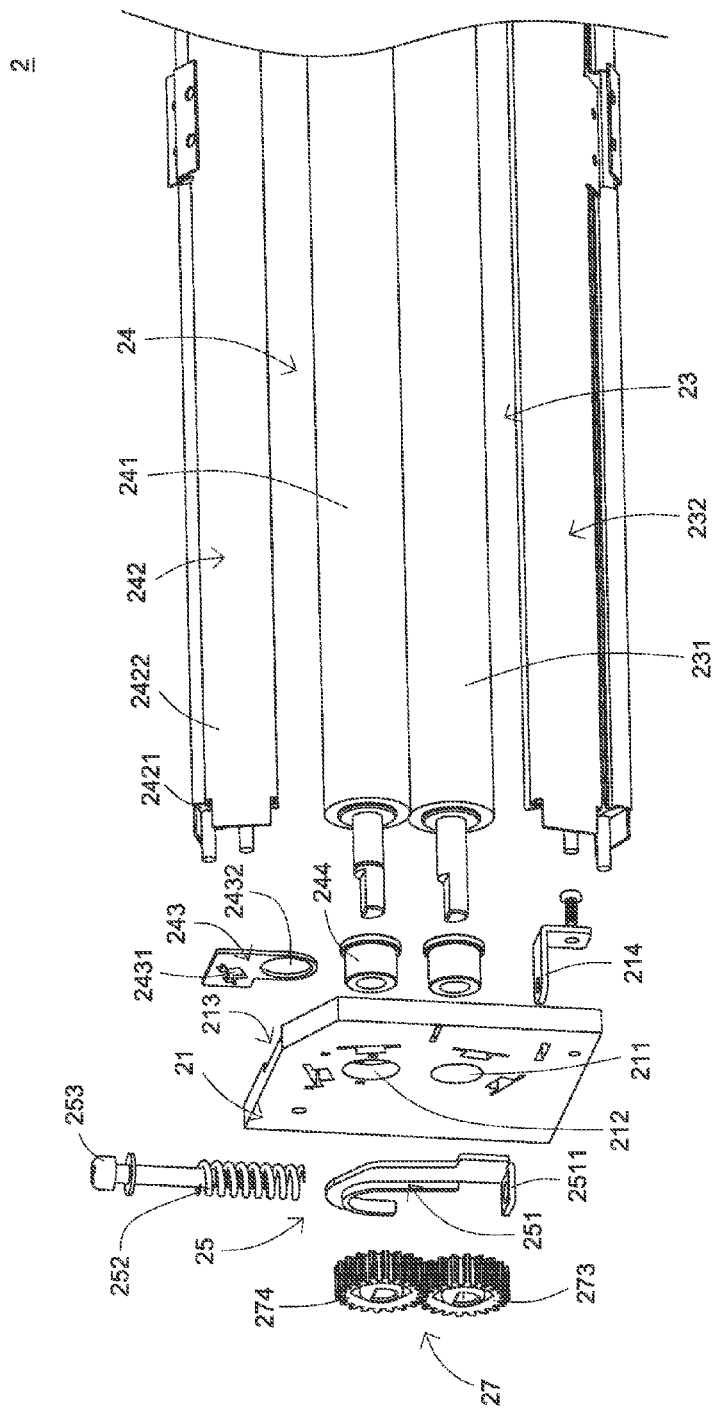
FIG. 5 is a schematic exploded view illustrating a first portion of the sheet laminating apparatus according to the first embodiment of the present invention.
Figure 6:
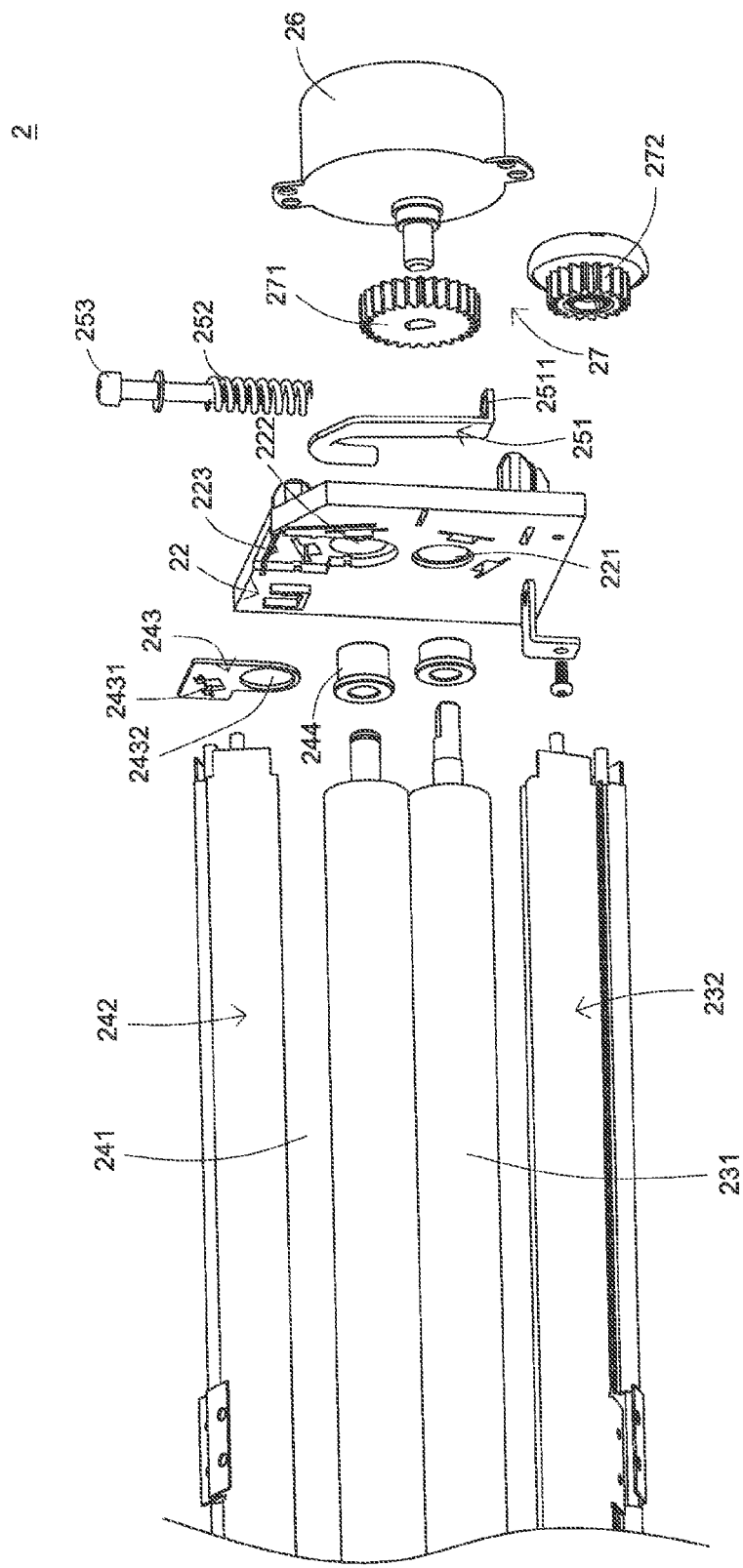
FIG. 6 is a schematic exploded view illustrating a second portion of the sheet laminating apparatus according to the first embodiment of the present invention.

Hereinafter, the detailed structures of the components of the sheet laminating apparatus 2 will be illustrated with reference to FIGS. 5 and 6. FIG. 5 is a schematic exploded view illustrating a first portion of the sheet laminating apparatus according to the first embodiment of the present invention. FIG. 6 is a schematic exploded view illustrating a second portion of the sheet laminating apparatus according to the first embodiment of the present invention. As shown in FIGS. 5 and 6, the first side plate 21 comprises a first opening 211, a second opening 212, a first sliding groove 213 and a fixing part 214. The first sliding groove 213 is formed in a surface of the first side plate 21. The second opening 212 is larger than the first opening 211. The second side plate 22 comprises a third opening 221, a fourth opening 222 and a second sliding groove 223. The second sliding groove 223 is formed in a surface of the second side plate 22. The fourth opening 222 is larger than the third opening 221. The first opening 211 and the third opening 221 have the same profiles. Similarly, the second opening 212 and the fourth opening 222 have the same profiles. Due to restriction of the viewpoint, the first sliding groove 213 is not clearly shown in FIG. 5. Since the first sliding groove 213 and the second sliding groove 223 have the same profiles, the profile of the first sliding groove 213 is realized according to the second sliding groove 223 as shown in FIG. 6. In this embodiment, the second opening 212 and the fourth opening 222 are elliptical openings, and the first opening 211 and the third opening 221 are circular openings. The fixing part 214 is fixed on the first side plate 21 via a screwing means.

As shown in FIG. 5, the first laminating module 23 comprises a first conveying and laminating roller 231 and a first heating member 232. When the two films S1' and S2' and the sheet article D' are transported across the first laminating module 23, the first conveying and laminating roller 231 is contacted with the second film S2' of the two films, and the first heating member 232 provides heat energy to the first conveying and laminating roller 231. The second laminating module 24 comprises a second conveying and laminating roller 241, a second heating member 242, a supporting member 243 and a fixed shaft collar 244. When the two films S1' and S2' and the sheet article D' are transported across the second laminating module 24, the second conveying and laminating roller 241 is contacted with the first film S1' of the two films, and the first film S1' is sustained against the second conveying and laminating roller 241 to the second conveying and laminating roller 241. At the same time, the first heating member 242 provides heat energy to the second conveying and laminating roller 241. The second heating member 242 comprises a second heat source 2421 and a second heat holding cover 2422. The second heat source 2421 is used for producing heat energy. The second heat holding cover 2422 encloses the second heat source 2421 to prevent from loss of the heat energy. In this embodiment, the second heat source 2421 is a heating wire.

The supporting member 243 is arranged between the second conveying and laminating roller 241 and the second heating member 242, and accommodated within the first sliding groove 213, so that the supporting member 243 is movable within the first sliding groove 213 with respect to the first side plate 21. The supporting member 243 comprises a first fixing hole 2431 and a second fixing hole 2432. The second heating member 242 penetrates through the first fixing hole 2431, so that the second heating member 242 is fixed on the supporting member 243. The fixed shaft collar 244 penetrates through the second fixing hole 2432 of the supporting member 243, so that the fixed shaft collar 244 is fixed on the supporting member 243. The second conveying and laminating roller 241 penetrates through the fixed shaft collar 244, so that the second conveying and laminating roller 241 is fixed on the supporting member 243. By means of the supporting member 243, the second conveying and laminating roller 241 and the second heating member 242 are connected with each other, so that the second conveying and laminating roller 241 and the second heating member 242 can be simultaneously moved. In addition, the second conveying and laminating roller 241 and the second heating member 242 are separated from each other by a spacing interval L (see FIG. 8A). In this embodiment, the supporting member 243 is a supporting slice.

The restoring mechanism 25 comprises a restoring frame 251, a spring 252 and a screw 253. The restoring frame 251 is connected with the fixed shaft collar 244 of the second laminating module 24, so that the restoring frame 251 is synchronously moved with the second laminating module 24. In addition, the restoring frame 251 has a sustaining part 2511. The spring 252 is in contact with the sustaining part 2511 for providing an elastic restoring force. The screw 253 is sheathed by the spring 252 and the sustaining part 2511, and tightened in the fixing part 214 of the first side plate 21. The screw 253 is used for fixing the spring 252 and compressing the spring 252, so that the spring 252 is sustained again the sustaining part 2511 of the restoring frame 251 to provide an elastic compressible force to the second conveying and laminating roller 241, thereby laminating the two films S1' and S2' and the sheet article D'.

Figure 7:
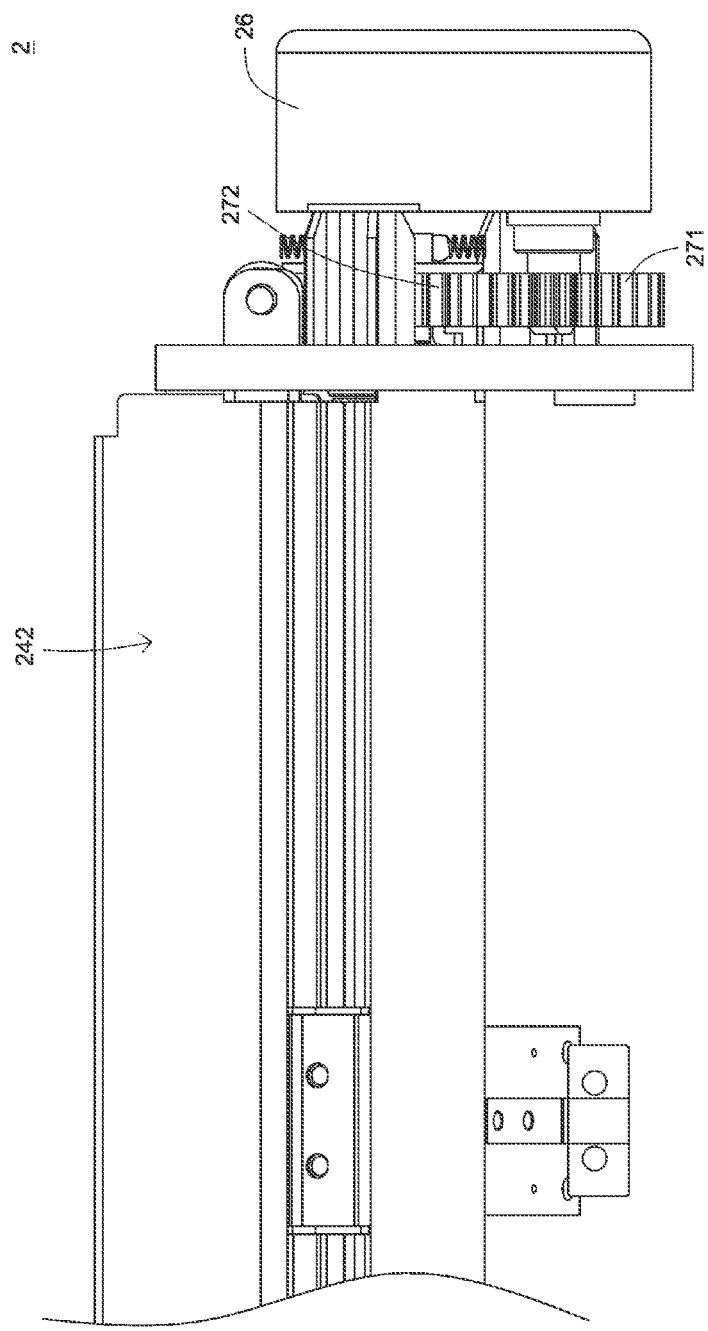
FIG. 7 is a schematic top view illustrating the sheet laminating apparatus according to the first embodiment of the present invention.

FIG. 7 is a schematic top view illustrating the sheet laminating apparatus according to the first embodiment of the present invention. Please refer to FIGS. 5, 6 and 7. The transmission mechanism 27 comprises a driving gear 271, a first transmission gear 272, a second transmission gear 273 and a third transmission gear 274. The driving gear 271 is connected with the driving motor 26 for transmitting the motive power from the driving motor 26. The first transmission gear 272 is connected to a first end of the first conveying and laminating roller 231, and engaged with the driving gear 271. As such, the first transmission gear 272 is synchronously rotated with the driving gear 271 to drive rotation of the first conveying and laminating roller 231. The second transmission gear 273 is connected to a second end of the first conveying and laminating roller 231, so that the second transmission gear 273 is synchronously rotated with the first conveying and laminating roller 231. The third transmission gear 274 is connected to the second conveying and laminating roller 241, and engaged with the second transmission gear 273. As such, the second conveying and laminating roller 241 is rotated as the second transmission gear 273 is rotated.

Figure 8A:
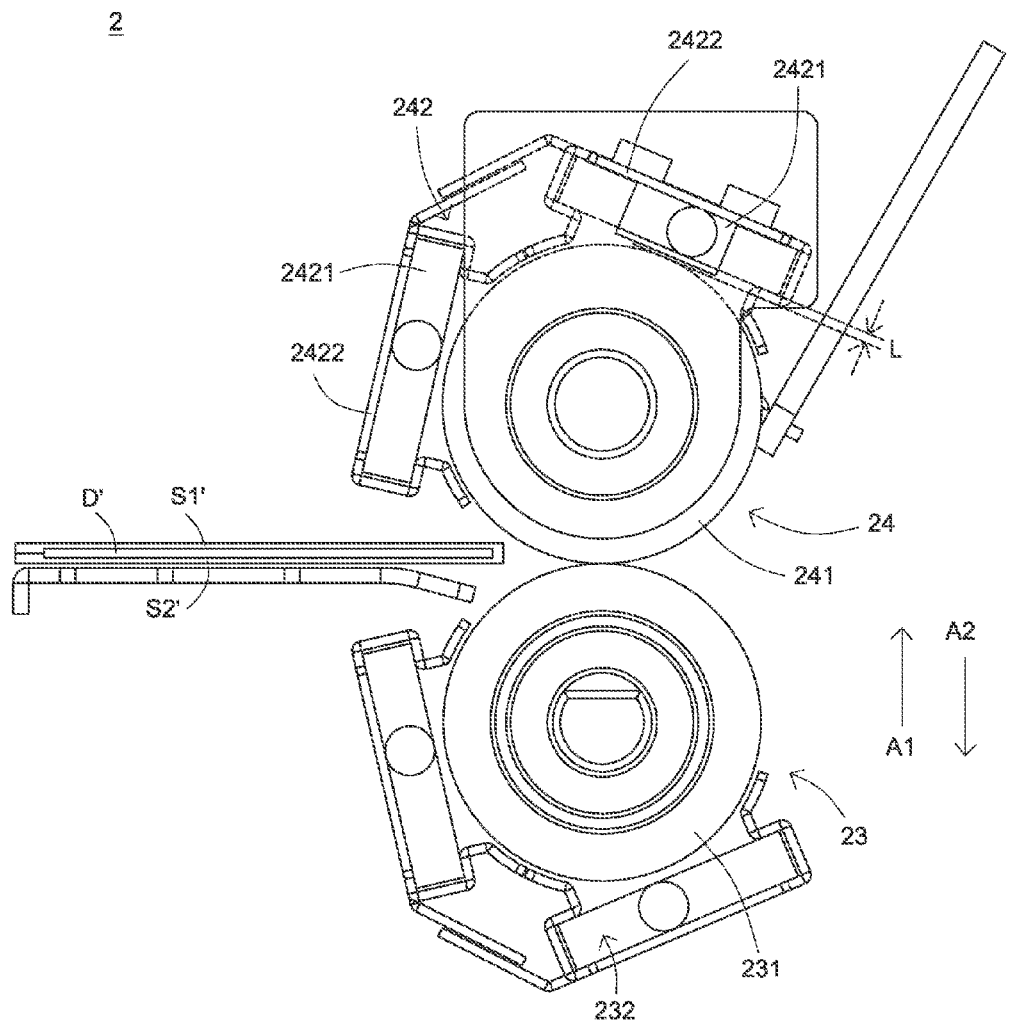
FIGS. 8A and 8B are schematic side views illustrating the sheet laminating apparatus according to the first embodiment of the present invention.
Figure 8B:
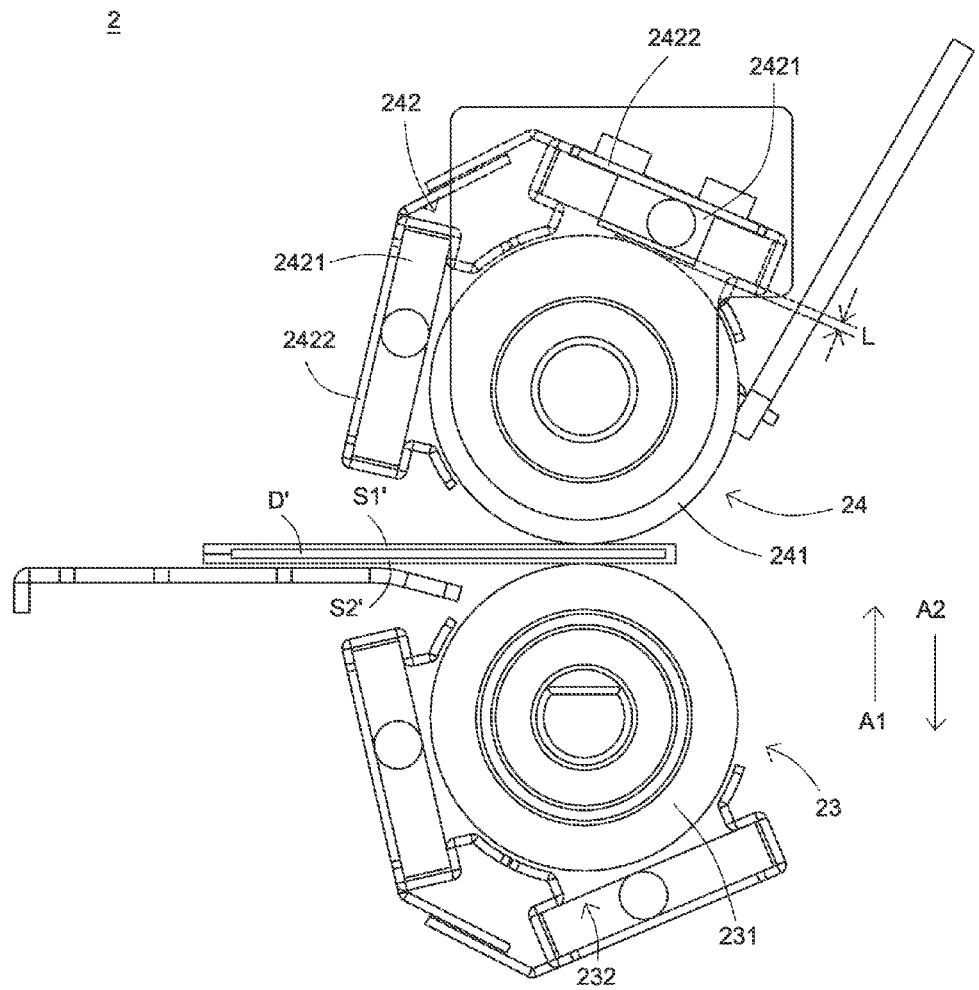

Hereinafter, a process of laminating the two films S1' and S2' and the sheet article D' will be illustrated with reference to FIGS. 8A and 8B. FIGS. 8A and 8B are schematic side views illustrating the sheet laminating apparatus according to the first embodiment of the present invention. As shown in FIG. 8A, the second heat source 2421 is enclosed by a U-shaped second heat holding cover 2422, and the second conveying and laminating roller 241 and the second heating member 242 are separated from each other by a spacing interval L. For laminating the two films S1' and S2' and the sheet article D' by the sheet laminating apparatus 2, the two films S1' and S2' and the sheet article D' are transported across the region between the first conveying and laminating roller 231 and the second conveying and laminating roller 241, and the two films S1' and S2' and the sheet article D' are contacted with the first conveying and laminating roller 231 and the second conveying and laminating roller 241. Since the first conveying and laminating roller 231 is fixed on the first side plate 21 and the second side plate 22, the two films S1' and S2' and the sheet article D' are not sustained against the first conveying and laminating roller 231 to move the first conveying and laminating roller 231. Whereas, the two films S1' and S2' and the sheet article D' are only sustained against the second conveying and laminating roller 241 to move the second conveying and laminating roller 241 in a first direction A1.

While the second conveying and laminating roller 241 is moved in the first direction A1, since the second conveying and laminating roller 241 penetrates through the fixed shaft collar 244 and the fixed shaft collar 244 penetrates through the second fixing hole 2432, the second conveying and laminating roller 241 is fixed on the supporting member 243. The second heating member 242 penetrates through the first fixing hole 2431, so that the second heating member 242 is fixed on the supporting member 243. As a consequence, the second conveying and laminating roller 241 and the second heating member 242 are synchronously moved in the first direction A1. In this situation, the supporting member 243 is moved within the first sliding groove 213 of the first side plate 21 in the first direction A1, and the spacing interval L between the second conveying and laminating roller 241 and the second heating member 242 is kept unchanged (see FIG. 8B).

After the laminating operation is done and the two films S1' and S2' and the sheet article D' are departed from the region between the first conveying and laminating roller 231 and the second conveying and laminating roller 241, the two films S1' and S2' and the sheet article D' are no longer sustained against the second conveying and laminating roller 241. Due to the elastic restoring force provided by the spring 252 of the restoring mechanism 25, the second conveying and laminating roller 241 and the second heating member 242 are synchronously moved in a second direction A2, which is opposed to the first direction A1. In this situation, the supporting member 243 is moved within the first sliding groove 213 in the second direction A2, so that the second conveying and laminating roller 241 and the second heating member 242 are returned to their original positions before the laminating operation is done (see FIG. 8A). Meanwhile, the laminating process is finished.

Especially, since the second opening 212 and the fourth opening 222 are elliptical openings, the second opening 212 and the fourth opening 222 provide space for moving both ends of the second conveying and laminating roller 241. When the first film S1' is not sustained against the second conveying and laminating roller 241, the both ends of the second conveying and laminating roller 241 are movable within the second opening 212 and the fourth opening 222 in the first direction A1.

Figure 9:
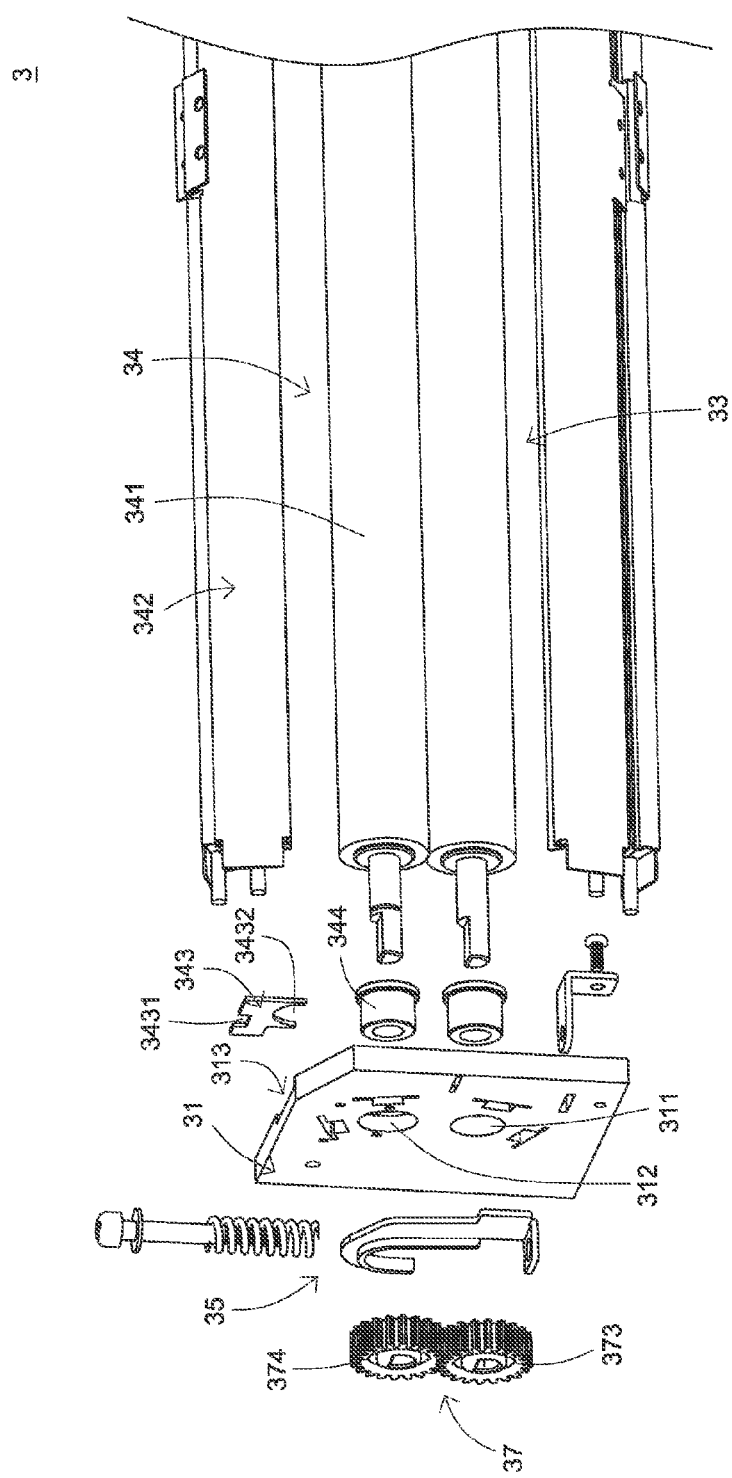
FIG. 9 is a schematic exploded view illustrating a first portion of a sheet laminating apparatus according to a second embodiment of the present invention.

The present invention further provides a second embodiment. FIG. 9 is a schematic exploded view illustrating a first portion of a sheet laminating apparatus according to a second embodiment of the present invention. The sheet laminating apparatus 3 comprises a first side plate 31, a second side plate (not shown), a first laminating module 33, a second laminating module 34, a restoring mechanism 35, a driving motor (not shown) and a transmission mechanism 37. The first side plate 31 comprises a first opening 311, a second opening 312 and a first sliding groove 313. The first sliding groove 313 is formed in a surface of the first side plate 31. The second opening 312 is larger than the first opening 311. In this embodiment, the second opening 312 is an elliptical opening, and the first opening 311 is a circular opening. The configurations and functions of the sheet laminating apparatus 3 are substantially identical to those of the sheet laminating apparatus 2, except that the second laminating module 34 is distinguished.

As shown in FIG. 9, the second laminating module 34 comprises a second conveying and laminating roller 341, a second heating member 342, a supporting member 343 and a fixed shaft collar 344. When the two films and the sheet article are transported across the second laminating module 34, the second conveying and laminating roller 341 is contacted with the first film of the two films, and the first film is sustained against the second conveying and laminating roller 341 to move the second conveying and laminating roller 341 is moved. At the same time, the first heating member 342 provides heat energy to the second conveying and laminating roller 341. The supporting member 343 is arranged between the second conveying and laminating roller 341 and the second heating member 342, and accommodated within the first sliding groove 313, so that the supporting member 343 is movable within the first sliding groove 313 with respect to the first side plate 31. The supporting member 343 comprises a first contact part 3431 and a second contact part 3432. The first contact part 3431 is contacted with the second heating member 342. As such, when the supporting member 343 is moved, the supporting member 343 is sustained against the second heating member 342 to move the second heating member 342. The fixed shaft collar 344 is connected with the first side plate 31 and contacted with the second contact part 3432. In addition, the second conveying and laminating roller 341 penetrates through the fixed shaft collar 344, so that the second conveying and laminating roller 341 is fixed on the first side plate 31. As such, when the second conveying and laminating roller 341 is moved, the fixed shaft collar 344 is moved with the second conveying and laminating roller 341, then the supporting member 343 is moved with the fixed shaft collar 344, and then the supporting member 343 is sustained against the second heating member 342 to move the second heating member 342. In addition, the second conveying and laminating roller 341 and the second heating member 342 are separated from each other by a spacing interval (not shown). In this embodiment, the supporting member 343 is a supporting slice. The configurations and operating principles of other components of the sheet laminating apparatus 3 are similar to those of the first embodiment, and are not redundantly described herein.

For laminating two films (not shown) and a sheet article (not shown) by the sheet laminating apparatus 3, the two films and the sheet article are transported across the region between the first conveying and laminating roller 331 and the second conveying and laminating roller 341, and the two films and the sheet article are contacted with the first conveying and laminating roller 331 and the second conveying and laminating roller 341. Since the first conveying and laminating roller 331 is fixed on the first side plate 31 and the second side plate, the two films and the sheet article are not sustained against the first conveying and laminating roller 331 to move the first conveying and laminating roller 331. Whereas, the two films and the sheet article are only sustained against the second conveying and laminating roller 341 to move the second conveying and laminating roller 341 in a first direction.

While the second conveying and laminating roller 341 is moved in the first direction, the fixed shaft collar 344 is moved with the second conveying and laminating roller 341, then the supporting member 343 is moved with the fixed shaft collar 344, and then the supporting member 343 is sustained against the second heating member 342 to move the second heating member 342. In this situation, the supporting member 343 is moved within the first sliding groove 313 of the first side plate 31 in the first direction, and the spacing interval between the second conveying and laminating roller 341 and the second heating member 342 is slightly changed during the moving process. Whereas, the spacing interval between the second conveying and laminating roller 341 and the second heating member 342 is kept unchanged if the second conveying and laminating roller 341 and the second heating member 342 are not moved. The further laminating operation is similar to that illustrated in the first embodiment, and is not redundantly described herein.

By the way, during the moving process, the spacing interval between the second conveying and laminating roller 341 and the second heating member 342 is only slightly increased when respective components are sustained against the second conveying and laminating roller 341 and the second heating member 342. Since the increase of the spacing interval between the second conveying and laminating roller 341 and the second heating member 342 is very tiny, the heat energy could be effectively transferred to the second conveying and laminating roller 341 with minimized loss of heat energy. In this situation, the efficiency of transferring heat energy between the second conveying and laminating roller 341 and the second heating member 342 is maintained.

From the above two embodiments, because of the supporting member, the second conveying and laminating roller and the second heating member are not contacted with each other during they are sustained and moved. As a consequence, the sheet laminating apparatus of the present invention can prevent from damaging the second conveying and laminating roller. Moreover, since the second conveying and laminating roller and the second heating member are not contacted with each other by using the supporting member, it is not necessary to largely broaden the spacing interval between the second conveying and laminating roller and the second heating member. As such, the efficiency of transferring heat energy could be maintained by the sheet laminating apparatus of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sheet laminating apparatus for laminating two films and a sheet article between said two films, said sheet laminating apparatus comprising:
    a first side plate;
    a second side plate;
    a first laminating module arranged between said first side plate and said second side plate, said first laminating module comprising a first conveying and laminating roller and a first heating member;
    a second laminating module arranged between said first side plate and said second side plate, and disposed beside said first laminating module, wherein when said two films and said sheet article are transported across a region between said first laminating module and said second laminating module, said two films and said sheet article are laminated by said first laminating module and said second laminating module, wherein said second laminating module comprises:
    a second conveying and laminating roller, wherein when said two films and said sheet article are transported across said second conveying and laminating roller, said second conveying and laminating roller is contacted with a first film of said two films, and said first film is sustained against said second conveying and laminating roller to move said second conveying and laminating roller;
    a second heating member for providing heat energy to said second conveying and laminating roller; and
    a supporting member arranged between said second conveying and laminating roller and said second heating member,
    wherein when said two films and said sheet article are transported across said region between said first laminating module and said second laminating module, said first film and said sheet article are sustained against said second conveying and laminating roller to move said second conveying and laminating roller, said supporting member and said second heating member in a first direction, but said second conveying and laminating roller is not contacted with said second heating member.

2. The sheet laminating apparatus according to claim 1 wherein said supporting member comprises a first fixing hole and a second fixing hole, said second heating member penetrates through said first fixing hole, said second heating member further comprises a fixed shaft collar penetrating through said second fixing hole, so that said fixed shaft collar is fixed on the supporting member, wherein said second conveying and laminating roller penetrates through said fixed shaft collar, so that said second conveying and laminating roller is fixed on said supporting member.

3. The sheet laminating apparatus according to claim 2 wherein said first side plate comprises:

a first opening, wherein said first laminating module penetrates through said first opening, so that said first laminating module is fixed on said first side plate;

a second opening, wherein said fixed shaft collar and said second laminating module penetrate through said second opening, and said fixed shaft collar and said second laminating module are movable within said second opening in said first direction; and a sliding groove formed in a surface of said first side plate for accommodating said supporting member, wherein when said two films and said sheet article are sustained against said second conveying and laminating roller, said supporting member is moved within said sliding groove in said first direction, wherein said second opening is larger than said first opening.

4. The sheet laminating apparatus according to claim 1 wherein said supporting member comprises a first contact part and a second contact part, said first contact part is contacted with said second heating member, and said second heating member further comprises a fixed shaft collar, which is connected with said first side plate and contacted with said second contact part, wherein said second conveying and laminating roller penetrates through said fixed shaft collar, so that said second conveying and laminating roller is fixed on said first side plate.

5. The sheet laminating apparatus according to claim 4 wherein said first side plate comprises:

a first opening, wherein said first laminating module penetrates through said first opening, so that said first laminating module is fixed on said first side plate;

a second opening, wherein said fixed shaft collar and said second laminating module penetrate through said second opening, and said fixed shaft collar and said second laminating module are movable within said second opening in said first direction, wherein said fixed shaft collar is sustained against said second contact part to move said supporting member in said first direction; and a sliding groove formed in a surface of said first side plate for accommodating said supporting member, wherein when said two films and said sheet article are sustained against said second conveying and laminating roller, said supporting member is moved within said sliding groove in said first direction, wherein said second opening is larger than said first opening.

6. The sheet laminating apparatus according to claim 1 further comprising a restoring mechanism, which is disposed on said supporting member and said first side plate for providing an elastic restoring force to said supporting member, so that said supporting member is moved in a second direction opposed to said first direction.

7. The sheet laminating apparatus according to claim 6 wherein said restoring mechanism comprises:

a restoring frame having a sustaining part, wherein said restoring frame is connected with said second laminating module, so that said restoring frame is synchronously moved with said second laminating module;

a spring contact with said sustaining part for providing said elastic restoring force; and a screw sheathed by said spring and said sustaining part, and tightened in a fixing part of said first side plate, wherein said spring is fixed and compressed by said screw, so that said spring is sustained again said restoring frame to provide an elastic compressible force in said second direction to said second conveying and laminating roller, thereby laminating said two films and said sheet article.

8. The sheet laminating apparatus according to claim 1 wherein when said two films and said sheet article are transported across said first laminating module, said first conveying and laminating roller is contacted with a second film of said two films;

and wherein said first heating member provides heat energy to said first conveying and laminating roller.

9. The sheet laminating apparatus according to claim 8 further comprising:

a driving motor for providing motive power; and a transmission mechanism for transmitting said motive power of said driving motor to said first laminating module and said second laminating module, wherein said second laminating module comprises:

a driving gear connected with said driving motor for transmitting said motive power of said driving motor;

a first transmission gear connected to a first end of said first conveying and laminating roller, and engaged with said driving gear, wherein said first transmission gear is synchronously rotated with said driving gear to drive rotation of said first conveying and laminating roller;

a second transmission gear connected to a second end of said first conveying and laminating roller, wherein said second transmission gear is synchronously rotated with said first conveying and laminating roller; and a third transmission gear connected to said second conveying and laminating roller, and engaged with said second transmission gear, wherein said second conveying and laminating roller is rotated as said second transmission gear is rotated.

10. The sheet laminating apparatus according to claim 1 wherein said second heating member comprises:

a second heat source for producing heat energy; and a second heat holding cover enclosing said second heat source to prevent from loss of said heat energy.

* * * * *